(12) United States Patent
Finkelstein et al.

(10) Patent No.: US 6,386,788 B1
(45) Date of Patent: May 14, 2002

(54) PANEL FASTENER STRIKE

(75) Inventors: Burl Finkelstein, Newnan; John A. Fry, Sparksburg, both of GA (US)

(73) Assignee: Kason Industries, Inc., Shenandoah, GA (US)

( * ) Notice: Subject to any disclaimer, the term of this patent is extended or adjusted under 35 U.S.C. 154(b) by 21 days.

(21) Appl. No.: 09/633,521

(22) Filed: Aug. 4, 2000

(51) Int. Cl.[7] .................................................. F16B 1/00
(52) U.S. Cl. ........................ 403/286; 403/283; 403/188
(58) Field of Search ................................ 403/187, 188, 403/283, 286, 292, 335

(56) References Cited

U.S. PATENT DOCUMENTS

| | | | |
|---|---|---|---|
| 3,383,639 A | * 5/1968 | Anderson et al. | 403/286 X |
| 4,102,586 A | * 7/1978 | Pearson et al. | 403/188 |
| 6,152,644 A | * 11/2000 | Hein | 403/286 X |

OTHER PUBLICATIONS

Panel Fastner brochure, "Rigid Rail Panel Fasteners", Kason Industries, Inc. (undated).

* cited by examiner

*Primary Examiner*—Lynne H. Browne
*Assistant Examiner*—John R. Cottingham
(74) *Attorney, Agent, or Firm*—Baker, Donelson, Bearman & Caldwell

(57) ABSTRACT

A panel fastener strike comprises a unitary casing formed with two substantially parallel face plates unitarily bridged together by a strap at one end and formed with two substantially coplanar flanges at an opposite end, and a pin mounted to the two face plates spaced from the casing strap. In manufacturing the strike the face plates are bent from a coplanar orientation to a parallel orientation while simultaneously seating opposite ends of the pin in the face plate mounting holes.

6 Claims, 3 Drawing Sheets

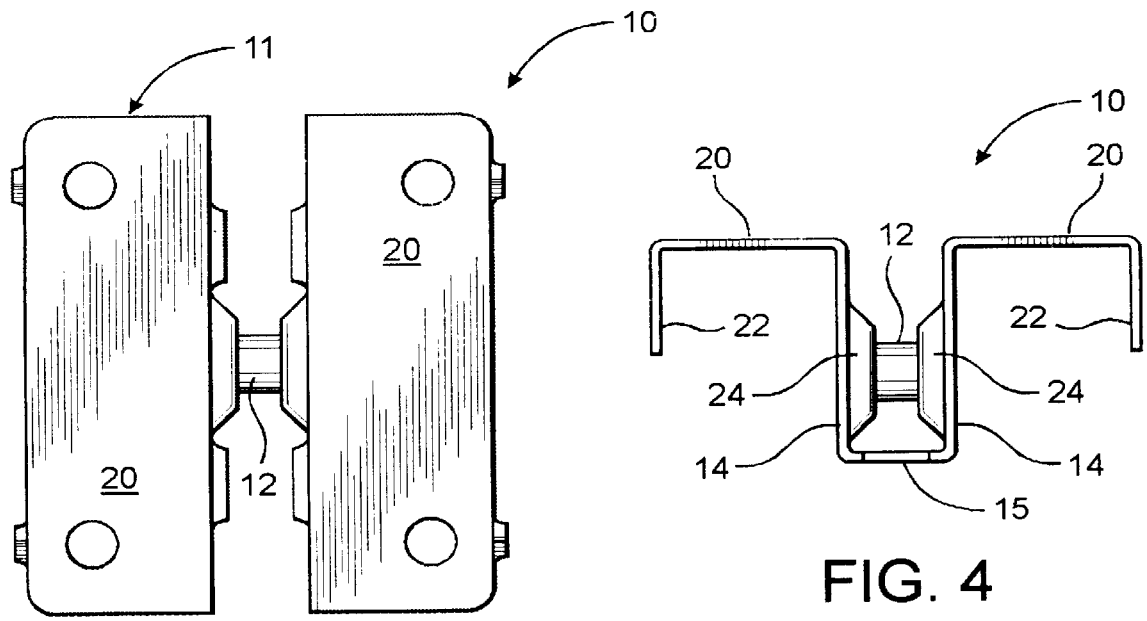
FIG. 3
FIG. 4
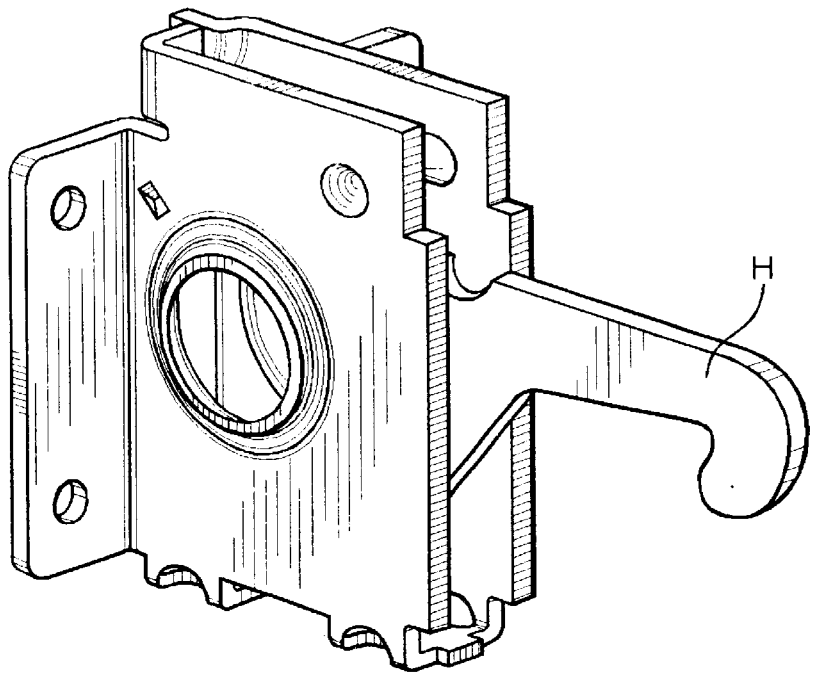
FIG. 5

PANEL FASTENER STRIKE

TECHNICAL FIELD

This invention relates generally to panel fasteners such as those used to fasten together large insulated panels of cooler room walls, floors and ceilings. The invention relates more particularly to the strikes of such panel fasteners and to methods of manufacturing such strikes.

BACKGROUND OF THE INVENTION

Commercial walk-in coolers, like those commonly found in convenience stores and commercial food storage facilities such as super markets, are typically constructed of insulating wall, ceiling and floor panels that are fastened snugly together. The panel ends are shaped to fit together in tongue and groove fashion and are provided with latch type fasteners for drawing and holding adjacent panels together. The latches themselves commonly comprise a hook and cam assembly that is mounted to one panel for latching engagement with a pin assembly that is mounted to an adjacent panel. The pin assembly is often referred to as a strike. Panels may have several of these fasteners, depending on their size.

Panel fastener strikes are commonly comprised of a metal casing that has two confronting, spaced face plates from which flanges unitarily extend. A pin extends between the two face plates which is accessible to a hook in latching the pin to a hook assembly mounted to an adjacent panel. Each end of the pin is mounted to a face plate by passing it through a boss that bulges outwardly from the face plate and swedging it over the boss recess on the back side of the face plate. Exemplary of such a panel fastener strike is model no. 1155 sold by Kason Industries, Inc. of Shenandoah, Ga.

Both the hook assembly and pin assembly of these fasteners are mounted to the ends of the panels with their flanges overlaying the panel faces. In fastening two panels together the hook is swung down into the pin assembly channel and into hooking engagement with the pin. Hook engagement with the strike is done with an over-center camming action as it is rotated with a wrench. This draws the pin and hook assemblies together which in turn draws the two panels to which they are mounted into snug engagement.

Sometimes the hook and pin assemblies are slightly misaligned or cocked when placed adjacent one another for fastening. When this occurs excessive force is applied by the hook to the pin. In this situation the two face plates of the pin assembly cam spread slightly, as shown in FIG. 1 of the drawing, as the far end of its face plate digs into its panel. This cocking and spreading causes an end of the pin P to cock in its boss B. In severe cases this can actually cause the fastener to fail by the pin separating from its mount. The present invention provides a commercially sound and viable solution to this problem.

SUMMARY OF THE INVENTION

In a preferred form of the invention a panel fastener strike comprises a unitary casing formed with two substantially parallel face plates unitarily bridged together by a strap at one end and formed with two substantially coplanar flanges at an opposite end. A pin is mounted to the two face plates spaced from the casing strap.

In another preferred form of the invention a panel fastener strike is made by forming a metallic blank with two sections each having a pin mounting hole and with the two sections bridged together by a strap. Each section is bent to form two substantially coplanar flanges and two face plates with the pin mounting holes located in the face plates and with the strap extending from the face plates. The two face plates are bent adjacent their junctures with the strap to a substantially parallel position while simultaneously locating opposite ends of a pin within the two face plates mounting holes.

BRIEF DESCRIPTION OF THE DRAWING

FIG. 3 is a front view of the strike of FIG. 2.

FIG. 4 is a top view of the strike of FIG. 2.

FIG. 5 is a perspective view of a conventional panel fastener hook assembly.

DETAILED DESCRIPTION

Figure 2:
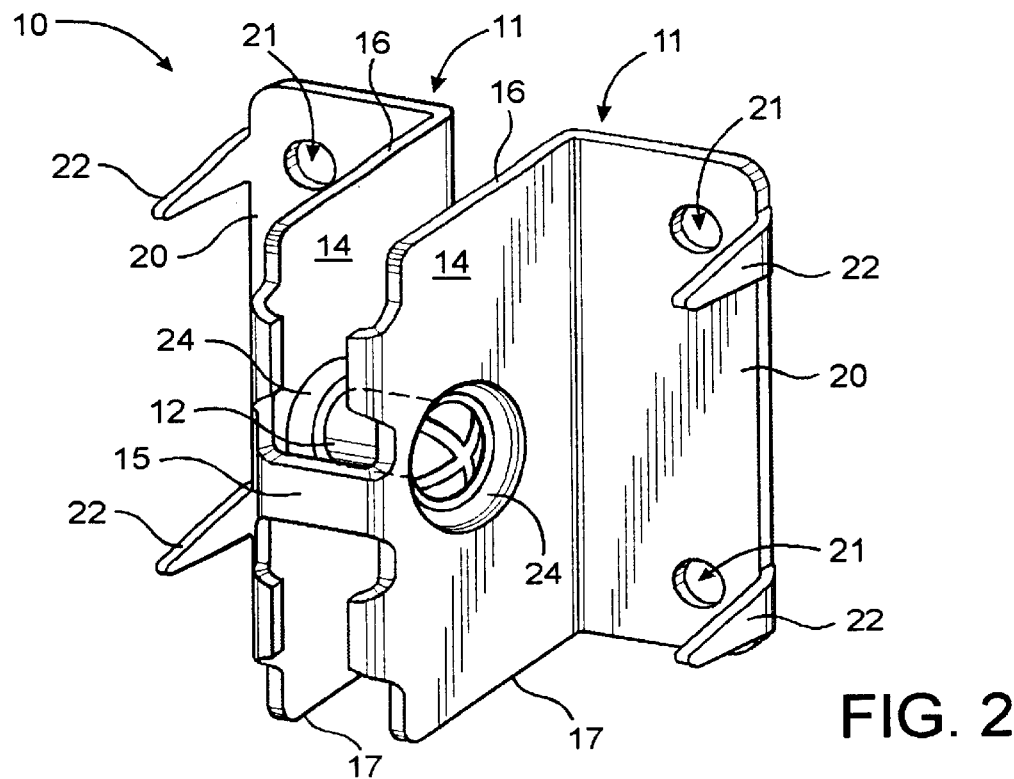
FIG. 2 is a perspective view of a panel fastener strike that embodies principles of the invention in its preferred form.

With reference again to the drawing, there is shown in FIGS. 2–4 a strike 10 that has a unitary casing shown generally at 11 and a pin 12. The casing has two face plates 14 that are parallel to each other and which are unitarily bridged together by a strap or bridge 15 generally midway between the face plates top edges 16 and bottom edges 17. The casing has two flanges 20 that are coplanar and which extend normally and unitarily from the front end of the face plates. Each flange is formed with two mounting holes 21 and with two spikes 22. These spikes extend normally from the flanges substantially parallel with the two face plates 14.

Each face plate is formed with a pin mounting hole within a boss 24. The bosses are annular and extend from the face plate inwardly towards the opposite face plate and its boss and then reentrantly along a concave inward surface that directly bounds the pin mounting hole. The bosses are located centrally along the face plates about midway between their top edges 16 and bottom edges 17 as is the strap 12. They are also located generally midway between the strap 15 and the end of the face plate from which the flanges 20 extend, as best shown in FIG. 4.

Figure 6:
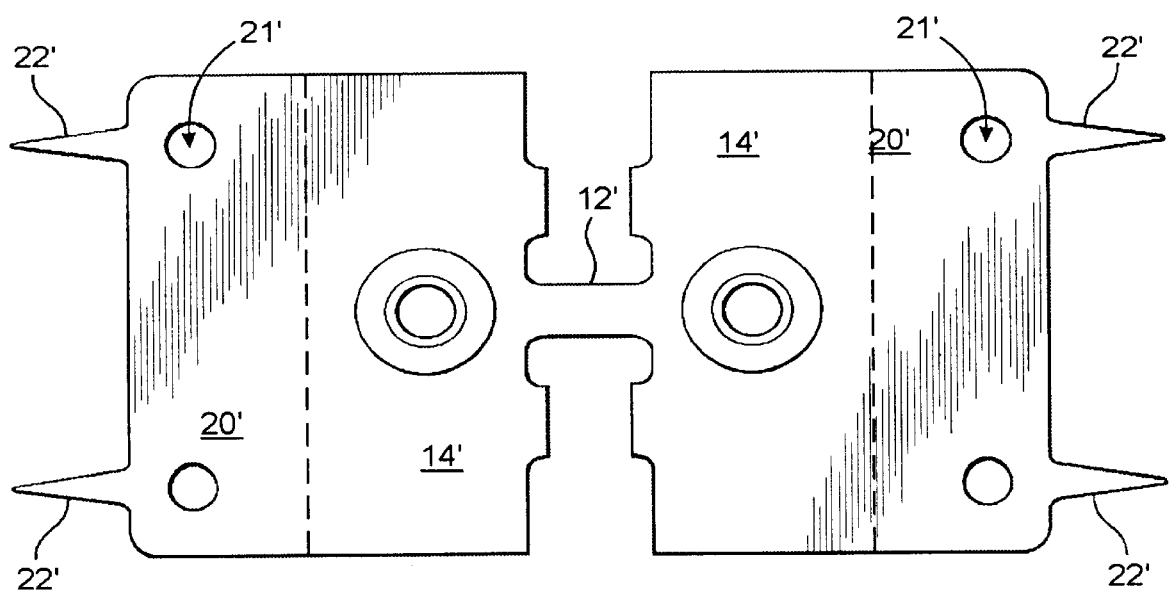
FIG. 6 is a face view of a metallic blank from which the casing of the strike of FIG. 2 is formed.

The strike is manufactured with its casing made from the unitary metallic blank shown in FIG. 6. The blank is formed with two generally rectangular sections bridged together by the strap 12. These two sections are bent to form the flanges and face plates oriented normally to each other. The blank spikes are bent and the bosses formed. In mounting the pin the two face plates are bent adjacent their junctures with the strap 15 with the pin 12 located over the strap. As this bending is done in bringing the two face plates to a parallel position, the opposite ends of the pin are brought into sliding contact with the concave surfaces of the bosses. Final bending of the face plates into their final parallel orientation causes the pins to slide into and become seated in the pin mounting holes at the bottoms of the bosses concave surfaces. Note that the reference numbers in FIG. 6 are indicated as primes since they have yet to be shaped by bending.

Figure 1:
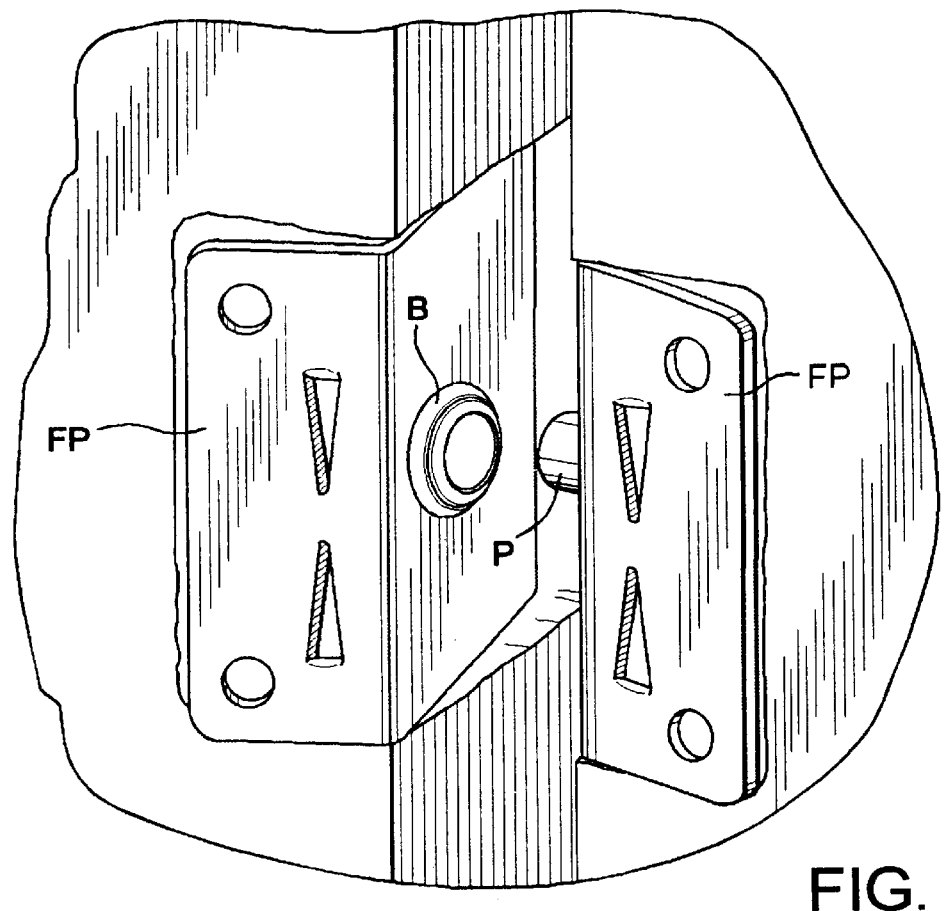
FIG. 1 is a perspective view of a panel fastener strike of the prior art shown failed.

For use the strike can be mounted with nails through the flange holes 21 or with the spikes 22. Since the spikes 22 are outboard of the channel between the face plates, they do not tend to damage the panel foam. That they project right angularly to the direction of the latch force, they well resist being pulled through panel foam. During latching and fastening the hook H of the hook assembly shown in FIG. 5 has ample space in which to swing over the pin 20 between it and the strap 15. Should the hook be misaligned with the strike, the strap 15 prevents the face plates from spreading as before. Thus the pin cannot come unseated and cause the fastener to fail as shown with the prior art strike of FIG. 1.

It thus is seen that a panel fastener strike is now provided that can be manufactured with facility and which is not prone to failure when it is latched to a hook of an adjacent panel. Though it has been described and shown in its preferred form, it should be understood that many modifications, additions or deletions may be made thereto without departure from the spirit and scope of the invention as set forth in the following claims.

What is claimed is:

1. A panel fastener strike comprising a unitary casing formed with two substantially parallel face plates unitarily bridged together by a strap at one end and formed with two substantially coplanar flanges at an opposite end, and a pin mounted to said two face plates spaced from said casing strap.

2. The panel fastener of claim 1 wherein said casing is formed with a plurality of spikes that extend from said flanges substantially parallel with said face plates.

3. The panel fastener of claim 1 wherein said face plates are formed with bosses through which said pin extends.

4. The panel fastener of claim 1 wherein said face plates have top and bottom edges and wherein said strap extends generally midway between said top and bottom edges.

5. The panel fastener of claim 4 wherein said pin is mounted to said two face plates generally midway between said face plates top and bottom edges.

6. The panel fastener of claim 5 wherein said pin is mounted to said face plates generally midway between said one end and said opposite end.

\* \* \* \* \*